United States Patent
Lesage et al.

(10) Patent No.: US 10,087,962 B2
(45) Date of Patent: Oct. 2, 2018

(54) ELECTRO HYDROSTATIC ACTUATORS

(71) Applicant: Goodrich Actuation Systems SAS, Buc (FR)

(72) Inventors: Emmanuel Lesage, Aulnay sur Iton (FR); Serge Grand, Villebon sur Yvette (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 210 days.

(21) Appl. No.: 15/197,975

(22) Filed: Jun. 30, 2016

(65) Prior Publication Data
US 2017/0002844 A1  Jan. 5, 2017

(30) Foreign Application Priority Data

Jun. 30, 2015 (EP) ..................................... 15306038
Sep. 23, 2015 (EP) ..................................... 15306480

(51) Int. Cl.
*F16D 31/02* (2006.01)
*F15B 21/04* (2006.01)
(Continued)

(52) U.S. Cl.
CPC .............. *F15B 21/04* (2013.01); *B64C 13/40* (2013.01); *F04B 1/122* (2013.01); *F04B 1/143* (2013.01);
(Continued)

(58) Field of Classification Search
CPC .... F15B 11/0423; F15B 11/055; F15B 15/18; F15B 20/002; F04B 1/28; F04B 1/34; F04B 17/03; F04B 49/24
(Continued)

(56) References Cited

U.S. PATENT DOCUMENTS

| 4,859,155 A | 8/1989 | Laqua |
| 4,934,143 A | 6/1990 | Ezell et al. |

(Continued)

FOREIGN PATENT DOCUMENTS

| CN | 103722996 A | 4/2014 |
| EP | 0395420 A2 | 10/1990 |

(Continued)

OTHER PUBLICATIONS

Extended European Search Report of the European Patent Office for International Application No. EP15306038.9, dated Feb. 11, 2016, 9 pages.

(Continued)

*Primary Examiner* — Michael Leslie
(74) *Attorney, Agent, or Firm* — Cantor Colburn LLP

(57) ABSTRACT

An electro hydrostatic actuator (EHA) comprises a hydraulic pump and an electric motor driving the hydraulic pump. The hydraulic pump comprises an inlet and an outlet for hydraulic fluid and an active fluid flow path arranged therebetween such that, in an active mode of operation when the pump is driven by the electric motor, hydraulic fluid is actively drawn in through the inlet and exhausted out through the outlet. The hydraulic pump further comprises a bypass flow path arranged between the pump inlet and outlet, such that, in a damping mode of operation, hydraulic fluid is able to freely flow between the inlet and outlet in either direction.

15 Claims, 6 Drawing Sheets

(51) Int. Cl.
| | |
|---|---|
| *F15B 20/00* | (2006.01) |
| *F04B 1/20* | (2006.01) |
| *F04B 49/24* | (2006.01) |
| *F15B 15/18* | (2006.01) |
| *B64C 13/40* | (2006.01) |
| *F15B 11/08* | (2006.01) |
| *F15B 21/08* | (2006.01) |
| *F04B 1/12* | (2006.01) |
| *F04B 1/14* | (2006.01) |
| *F04B 17/03* | (2006.01) |
| *F15B 1/02* | (2006.01) |
| *F15B 13/10* | (2006.01) |
| *F15B 15/08* | (2006.01) |
| *F15B 21/00* | (2006.01) |
| *F15B 7/00* | (2006.01) |
| *F15B 11/024* | (2006.01) |
| *B64C 13/50* | (2006.01) |

(52) U.S. Cl.
CPC .............. *F04B 1/145* (2013.01); *F04B 1/146* (2013.01); *F04B 1/20* (2013.01); *F04B 17/03* (2013.01); *F04B 49/24* (2013.01); *F15B 1/02* (2013.01); *F15B 7/006* (2013.01); *F15B 11/024* (2013.01); *F15B 11/08* (2013.01); *F15B 13/10* (2013.01); *F15B 15/08* (2013.01); *F15B 15/18* (2013.01); *F15B 20/002* (2013.01); *F15B 21/001* (2013.01); *F15B 21/008* (2013.01); *F15B 21/08* (2013.01); *B64C 13/504* (2018.01); *F15B 2011/0243* (2013.01); *F15B 2211/205* (2013.01); *F15B 2211/2053* (2013.01); *F15B 2211/20515* (2013.01); *F15B 2211/20561* (2013.01); *F15B 2211/27* (2013.01); *F15B 2211/3058* (2013.01); *F15B 2211/31529* (2013.01); *F15B 2211/32* (2013.01); *F15B 2211/327* (2013.01); *F15B 2211/625* (2013.01); *F15B 2211/6658* (2013.01); *F15B 2211/7052* (2013.01); *F15B 2211/7054* (2013.01)

(58) Field of Classification Search
USPC .................... 60/468, 473, 476; 417/270, 440
See application file for complete search history.

(56) References Cited

U.S. PATENT DOCUMENTS

| | | | |
|---|---|---|---|
| 5,097,857 A | 3/1992 | Mayhew | |
| 5,144,801 A | 9/1992 | Scanderbeg et al. | |
| 5,700,136 A * | 12/1997 | Sturman | F04B 49/243 417/270 |
| 6,625,982 B2 * | 9/2003 | Van Den Bossche | B64C 13/42 60/403 |
| 7,191,593 B1 * | 3/2007 | Ho | B64C 13/50 60/473 |
| 7,434,395 B2 | 10/2008 | He | |
| 8,434,301 B2 | 5/2013 | Fukui | |
| 8,776,513 B2 | 7/2014 | Nishioka | |
| 8,840,118 B1 | 9/2014 | Giovanardi et al. | |
| 8,935,015 B2 | 1/2015 | Olsoe et al. | |
| 2001/0033799 A1 | 10/2001 | Staton et al. | |
| 2003/0000765 A1 | 1/2003 | Spadafora | |
| 2008/0010984 A1 | 1/2008 | Arbel et al. | |
| 2013/0067898 A1 | 3/2013 | Onishi et al. | |
| 2015/0308463 A1 | 10/2015 | Gomm et al. | |
| 2016/0076558 A1 | 3/2016 | Gomm et al. | |
| 2017/0002845 A1 * | 1/2017 | Lesage | F04B 49/24 |
| 2017/0356476 A1 | 12/2017 | Lesage et al. | |

FOREIGN PATENT DOCUMENTS

| | | |
|---|---|---|
| EP | 1806506 A2 | 7/2007 |
| EP | 1878598 A1 | 1/2008 |
| EP | 2322808 A2 | 5/2011 |
| EP | 2692636 A1 | 2/2014 |
| WO | 9811357 A1 | 3/1998 |
| WO | 2014176252 A1 | 10/2014 |

OTHER PUBLICATIONS

Extended European Search Report of the European Patent Office for International Application No. EP15306480.3, dated Feb. 19, 2016, 7 pages.

Extended European Search Report for International Application No. 16305707.8 dated Nov. 28, 2016, 8 pages.

* cited by examiner

ELECTRO HYDROSTATIC ACTUATORS

FOREIGN PRIORITY

This application claims priority to European Patent Application No. 15306038.9 filed Jun. 30, 2015 and European Patent Application No. 15306480.3 filed Sep. 23, 2015, the entire contents of which are incorporated herein by reference.

TECHNICAL FIELD

The present disclosure relates to electro hydrostatic actuators and in particular to those comprising an electrically powered motor-pump assembly to generate pressure and flow control for the hydraulic actuator.

BACKGROUND

An electro hydrostatic actuator (EHA) is a self-contained actuator run and controlled by its own electrically powered motor-pump assembly, thereby eliminating the need for a separate hydraulic pump. In aerospace applications, EHAs are typically a fly-by-wire (FBW) device that is operated by control electronics. The hydraulic actuator of an EHA may be used to move aerodynamic surfaces such as a steering flap on an aircraft wing. EHAs may replace conventional hydraulic actuator systems in an aircraft for various operations, including e.g. landing gear retraction/extension, steering, braking, and fluid control.

Especially when EHAs are used to control components of aircraft operation, it is important to provide redundancy in the event of electrical power generation failure or control path electronics failure. It has previously been proposed, for example as seen in US 2013/0067898, for an EHA to comprise a failsafe hydraulic circuit that includes additional hydraulic oil paths allowing communication between the jack chambers of the hydraulic actuator and a solenoid "mode" valve that can be switched to connect the additional hydraulic oil paths and allow for a bypass flow of hydraulic oil outside the electrically-powered hydraulic pump, e.g. in an emergency state of power loss. In such an emergency state, the hydraulic actuator is still able to provide a damping force to its aerodynamic surface. This damping effect is switched on or off by the additional solenoid valve in the hydraulic circuit.

The present disclosure seeks to provide improvements in an electro hydrostatic actuator.

SUMMARY

According to an aspect of this disclosure there is provided an electro hydrostatic actuator (EHA) comprising: a hydraulic pump and an electric motor driving the hydraulic pump to supply hydraulic fluid to a hydraulic actuator; the hydraulic pump comprising an inlet and an outlet for hydraulic fluid and an active fluid flow path arranged therebetween such that, in an active mode of operation when the pump is driven by the electric motor, hydraulic fluid is actively drawn in through the inlet and exhausted out through the outlet; the hydraulic pump further comprising a bypass flow path arranged between the pump inlet and outlet, such that, in a damping mode of operation, hydraulic fluid is able to freely flow between the inlet and outlet in either direction; and the electric motor comprising a moveable member arranged to move within the motor such that, when the motor is energised so as to drive the pump in the active mode of operation, the member has a blocking position that acts to block the bypass flow path, and when the motor is not energised the member moves within the motor to open the bypass flow path in the damping mode of operation.

In the active mode of operation, when the pump is driven by the electric motor, the EHA operates normally with the hydraulic pump generating pressure and flow control for the hydraulic actuator. For example when the electric motor is not energized, e.g. in case of electrical power failure or EHA control electronics failure, the bypass flow path allows hydraulic fluid to pass through the pump and achieve a damping effect for the hydraulic actuator. This also provides a default mode when the hydraulic actuator is not required to be actively engaged. By opening a bypass flow path between the inlet and outlet of the pump, a damping mode of operation is integrated into the pump rather than requiring an additional solenoid "mode" valve in the hydraulic circuit between the pump and the actuator. This reduces the number of components in the EHA, as well as allowing an envelope reduction for the device. For example, the EHA may no longer require a separate solenoid mode valve with its own power supply and control electronics, and anti-cavitation valves. The associated flow path necessary in the hydraulic manifold will be consequently removed with a cost and weight reduction for the EHA. Furthermore, such an EHA may provide improved reliability due to the integration of damping control into the hydraulic pump-motor assembly.

Although the pump is described as having a discernible inlet and outlet at any point in time, it will be appreciated that the physical port(s) providing the inlet and outlet may change in time. A pump as described typically comprises multiple ports in fluid communication with the hydraulic actuator; at any one time one or more of these ports may act as an inlet and one or more of these ports may act as an outlet. Such ports, i.e. the inlet and outlet, are usually provided by a port plate attached to the base of the pump. For a rotary pump, when the rotational direction of the motor is reversed, the pump operates to supply hydraulic fluid in the opposite direction, and the inlet and outlet may swap over. Additionally, although only an inlet and outlet is disclosed in relation to the active flow path and bypass flow path, it is possible that the pump may comprise one or more further inlets and/or outlets e.g. providing other flow paths. For example, in the case of a dissymmetrical pump, there may be an additional outlet to facilitate fluid flow to an accumulator.

The moveable member, arranged to move within the motor, may be arranged to move rotationally so as to open the bypass flow path in the damping mode of operation. However, in a preferred set of examples the member is arranged to move axially within the motor to open the bypass flow path. The member may therefore move axially to/from the blocking position.

In examples where the moveable member is arranged to move axially within the motor, the axial movement of the member is considered to be along the axis of the motor. The axis of the motor is typically defined as the axis which a motor shaft rotates around. The motor shaft is the component of the motor which typically drives the pump in the active mode.

The motor may comprise any suitable moveable member for blocking the bypass flow path in the active mode of operation. In a preferred set of examples the member is an elongate rod. Such an elongate rod may extend from a main motor housing, where the coils which drive the motor are typically housed, through the motor shaft to the pump. The elongate rod may, for example, pass through a hollow core of the motor shaft into the hydraulic pump. In a further preferred set of examples the elongate rod further comprises an end portion at its end proximal to the bypass flow path, shaped in order to block the bypass flow path. This end portion may, for example, be comprised of a disk shaped portion designed so as to block the bypass flow path. The use of an elongate rod to block the bypass flow path is advantageous as it provides a simple mechanism for controlling the bypass flow path. Such an elongate rod may be rotated or axially moved to/from the blocking position.

The EHA may comprise any suitable arrangement for positioning the moveable member so as to block the bypass flow path when the electric motor is energised. The electric motor may comprise an electromagnetic arrangement that holds the member in the blocking position. Typically an electric motor comprises coils forming an armature around the motor shaft. In a set of examples, the electromagnetic arrangement comprises one or more additional coils arranged to magnetise the moveable member. In such a set of examples, when the motor is energised part of the moveable member proximal to the additional coils is magnetised. The motor preferably comprises one or more fixed ferromagnetic portions so that the magnetised member is attracted to the ferromagnetic portions. This holds the moveable member in the blocking position so as to block the bypass flow path. In a further preferred set of examples the end of the moveable member proximal to the additional coils is shaped so as to create a maximum area of magnetised material. When the additional coils are energised this ensures that the moveable member is held securely in its blocking position. In a preferred set of examples the number of additional coils used to hold the moveable member is the same as the number of coils used to drive the motor. However, it has been found that two additional coils may be sufficient even if there are three main coils used to drive the motor.

The additional coils may be connected in series or in parallel with the main motor coils (e.g. the coils forming an armature around the motor shaft). In examples where the EHA is provided with additional coils to magnetise the moveable member, each of the additional coils is preferably connected in series with one of the main motor coils. This provides a failsafe, e.g. if there should be a lack of confidence in the robustness of the additional coils, as failure of one of the additional coils will interrupt the main motor energisation circuit. However, it is appreciated that in some examples the additional coils may be connected in parallel with the main motor coils. This can mitigate the risk of an open circuit being created by failure of one of the coils. In addition, or alternatively, in some examples the additional coils may share a power supply with the main motor coils. This means that the electromagnetic arrangement is automatically energised at the same time as the motor, e.g. the moveable member may be held in its blocking position by the electromagnetic arrangement whenever the motor is energised. In other examples the additional coils may have their own, separate, power supply. This approach may be taken where there is low confidence in the stability of using the same e.g. AC power supply to operate the additional coils. Furthermore, this means that it may be possible to control movement of the moveable member independently, for instance in the event of a power supply failure for the main motor coils. In such examples a single additional coil may suffice, although the additional coil will require additional wiring to the separate power supply.

In a set of examples the moveable member does not rotate when the pump is in the active mode of operation. In an alternative set of examples the moveable member rotates with the motor shaft in the active mode of operation. Allowing the moveable member to rotate may make manufacture of the pump simpler as it would mean that there is no need for any bearings between the moveable member and rotating parts of the motor such as the motor shaft.

As previously discussed the bypass flow path is opened, for example, when the motor is not energised. Of course the bypass flow path may take the form of a flow path that is only fully created when the pump is not driven by the electric motor, or the bypass flow path may take the form of a flow path that always exists in the pump but is only unblocked, uncovered, accessible etc. when the electric motor is not energised. Control electronics could provide for opening the bypass flow path when the electric motor is turned off or there is a power supply failure. However this is likely to require a backup power supply for such control electronics. It is preferable that the moveable member is moved automatically, to open the bypass flow path, when the electric motor is not energised. This not only eliminates the need for a solenoid valve outside the pump but also a failsafe power supply to control the damping mode of operation. Rather, the damping mode of operation is automatically provided by the pump as a default mode whenever the electric motor is not active.

The EHA may comprise any suitable arrangement for automatically moving the moveable member when the electric motor is not energised. For example a resilient member could act to bias the moveable member into a position that unblocks or opens the bypass flow path. In preferred examples the pump comprises such a resilient member arranged to move the member and thereby open the bypass flow path when the electric motor is not energised. Positioning the resilient member in the pump is advantageous as it requires minimal alteration to the pump. Alternatively the resilient member may be positioned at any suitable position in the motor, for example in the motor housing or in/on the motor shaft. Positioning the resilient member away from pump may be advantageous as it can be arranged such that it does not have a direct impact on the bypass flow path. For example a resilient member in the pump may at least partially obstruct the bypass flow path even when the bypass flow path is opened. This may be disadvantageous in some instances, however it may be possible to incorporate this into the design of the bypass flow path. Such a resilient member may provide a resilient bias that tends to move the moveable member to open the bypass flow path. For example, the resilient bias may be provided by a spring device. The resilient bias may be overcome when the electric motor is energised. It is appreciated that it may be beneficial to use a plurality of resilient members, as it would ensure that even if one resilient member were to fail that the EHA would still be able to enter the damping mode. This is particularly important when the damping mode is initiated upon power failure.

It will be appreciated that the rate of hydraulic fluid flow through the pump along the bypass flow path can determine the damping effect on the hydraulic actuator. In prior art arrangements that use a solenoid valve outside the pump to provide a damping mode, the damping factor is an absolute value set by the flow resistance of the valve. Activating such a valve merely turns the damping factor on/off. In examples of the present disclosure, on the other hand, the bypass flow path through the pump may be adjustable to provide a desired damping factor for the hydraulic fluid. It may be possible to dynamically adjust the bypass flow path, for example by adjusting the degree to which the bypass flow path is opened in situ.

Preferably the size of the bypass flow path can be adjusted during manufacture, installation and/or use of the pump to provide a desired damping factor for the hydraulic actuator, for example by adjusting the cross section of the bypass flow path. In some examples this may be achieved by selecting or changing the size of the moveable member, for instance during manufacture and/or installation. Alternatively, or in addition, this may be achieved by selecting or changing the freedom of movement of the moveable member. This can conveniently provide for adjustment during use of the EHA. In a preferred set of examples the distance that the moveable member extends into the bypass flow path, whilst in the damping mode, can be adjusted. In a further preferred set of examples the distance that the moveable member extends into the bypass flow path in the damping mode is set by a position limiting pin which acts to restrict movement of the member. Accordingly the motor may comprise a pin arranged to limit the position of the member when it moves to open the bypass flow path. In at least some examples such a pin may be arranged to limit an axial position of the moveable member.

In a further preferred set of examples, such a position limiting pin is adjustable. This may for example be provided by a threaded pin. An adjustable position limiting pin can allow for dynamic adjustment of the bypass flow path even after manufacture and installation of the EHA. Adjustment of the position limiting pin may be undertaken to modify the damping factor depending on the desired damping factor for a particular use of the hydraulic actuator. For instance, in an example where the hydraulic actuator is to act on an aerodynamic surface (such as a steering flap) in an aircraft then the damping factor may be chosen to allow hydraulic fluid to pass along the bypass flow path through the pump so that movement of the surface is damped even if the motor has failed. By adjusting the size of the bypass flow path, the damping factor can be tailored to a particular application. Note that the hydraulic fluid is not pressurised or energised by the pump in the damping mode of operation and flow along the bypass path is driven solely by movement of the hydraulic actuator.

It may be desirable, as a safety feature, to sense whether the EHA has properly entered the damping mode or whether the damping mode is available. For example, if it is detected that the damping mode of operation is not available (e.g. due to a blockage in the bypass flow path in the pump or failure of the axially moveable member), then an alert may be triggered. The alert could seek for maintenance to be carried out on the EHA or raise an emergency state. In at least some examples it is preferable that the EHA comprises a sensor arranged to detect whether the bypass flow path is open between the inlet and the outlet of the pump. Such a sensor may be arranged to directly detect whether the bypass flow path is open, for example by measuring hydraulic fluid pressure and actuator velocity. However it may be easier for the sensor to indirectly detect whether the bypass flow path is open, for example by measuring a property of the pump or motor. As the moveable member operates to open/block the bypass flow path, a sensor may detect movement of the member to determine whether the bypass flow path is open. In a preferred set of examples a linear transducer is arranged to detect the position of the moveable member. In a preferred set of examples the linear transducer is positioned in the motor.

There are various types of rotary pump that are suitable for use in EHA applications, these have associated advantages and disadvantages. Types of suitable pump may include: rotary piston, bent axis, radial piston and gear pumps. There will now be described a preferred set of examples wherein the hydraulic pump is a rotary piston pump. The rotary piston pump preferably comprises a pump barrel driven to rotate by a motor shaft, and a plurality of axial cylinders in the pump barrel arranged to receive reciprocating pistons. In such a pump, the inlet has a fluid connection with the axial cylinders in one half of the pump barrel and the outlet has a fluid connection with the axial cylinders in the other half of the pump barrel.

In one set of examples, the rotary piston pump is an axial piston pump comprising an angled cam surface (e.g. a swash plate) that is fixed relative to the motor shaft to cause the pistons to progressively reciprocate in the axial cylinders as the barrel rotates. When the pump is driven by the electric motor, hydraulic fluid is drawn through the inlet by the piston strokes on one side of the pump barrel and pushed out of the outlet by the piston strokes on the other side of the pump barrel. According to the present disclosure the pump additionally includes a bypass flow path that allows hydraulic fluid to pass through the pump between the inlet and outlet when the pump is idle i.e. not driven by the motor so that the pistons do not reciprocate in the axial cylinders. When the pump is not driven by the motor i.e. the motor is not energised, the moveable member moves to open the bypass flow path in the pump.

Preferably the bypass flow path is arranged to pass through or around the motor shaft between the inlet connected to the axial cylinders in one half of the pump barrel and the outlet connected to the axial cylinders in the other half of the pump barrel (or vice versa). The bypass flow path through or around the motor shaft may be connected to the axial cylinders in the pump barrel but does not involve hydraulic fluid passing axially along the cylinders i.e. the bypass flow path does not encounter the pistons. It will be appreciated that this is entirely different to a normal piston pump, wherein fluid can only pass through the cylinders in the pump barrel between the inlet and the outlet (for a given rotation direction) when the pistons are driven by the motor.

In a preferred set of examples the bypass flow path comprises one or more connecting ports in the pump barrel that provide a direct fluid path, in the damping mode of operation, between the inlet connected to axial cylinders in one half of the pump barrel and the outlet connected to the axial cylinders in the other half of the pump barrel. Preferably the moveable member is arranged in the motor shaft to have a position that blocks the flow of fluid through the connecting ports in the active mode of operation. For example, the connecting ports may lead radially inwards to a central chamber that is aligned with the motor shaft so as to be blocked or unblocked by movement of the member. The one or more connecting ports may comprise a connecting port in the pump barrel in fluid communication with each of the axial cylinders in the pump barrel. In other words, the pump barrel may comprise multiple connecting ports and at least one connecting port for each of the axial cylinders. The connecting ports may be generally radial ports passing between each of the axial cylinders in the pump barrel and the core of the barrel. In accordance with the present disclosure, in the active mode, the moveable member is positioned so as to block the connecting ports so that fluid can only travel in through the inlet and out through the outlet by the reciprocating pistons. In the damping mode the moveable member is positioned so as to open the connecting ports and thus open the bypass flow path.

In various examples of the present disclosure, the hydraulic actuator (e.g. a piston reciprocating in a cylinder) may be arranged to generate displacement for an aircraft component, for example an aerodynamic surface such as a steering flap on a wing. The hydraulic actuator may take the form of a linear actuator comprising a ram moving axially in a cylinder and/or a rotary actuator.

According to another aspect of this disclosure there is provided a method of controlling and damping a hydraulic actuator, comprising: energising an electric motor to drive a hydraulic pump to supply hydraulic fluid to the hydraulic actuator in an active mode of operation; and controlling movement of a moveable member arranged within the motor to open a bypass flow path through the hydraulic pump when the pump is not driven by the electric motor in a damping mode of operation. Instead of controlling a separate solenoid mode valve in the hydraulic manifold, movement of the moveable member within the motor is controlled to effect damping. This control may conveniently be integrated with control of the motor.

The moveable member arranged within the motor may, for example, be arranged to move axially. In such examples it is preferable that the axial movement of the member is controlled to open the bypass flow path.

In a set of examples, controlling movement of the moveable member comprises energising one or more additional coils arranged to magnetise the moveable member. These additional coils may be connected electrically in parallel or in series with the normal motor coils. The one or more additional coils may be provided with their own power supply or they may share a power supply with the main coils of the motor.

In a set of examples, the method further comprises adjusting the size of the bypass flow path during use of the pump to provide a desired damping factor for the hydraulic actuator. Adjusting the size of the bypass flow path may comprise adjusting a pin that is arranged to limit the position of the member when it moves to open the bypass flow path. This is described in more detail hereinabove.

When viewed from another broader aspect, the present disclosure provides an electro hydrostatic actuator (EHA) comprising: a hydraulic pump driven by an electric motor to supply hydraulic fluid to a hydraulic actuator; the pump comprising an inlet and an outlet for the hydraulic fluid and an active flow path arranged therebetween such that, in an active mode of operation when the pump is driven by the electric motor, hydraulic fluid is actively drawn in through the inlet and exhausted out through the outlet; and the pump further comprising a bypass flow path arranged to open between the inlet and outlet such that, in a damping mode of operation when the pump is not driven by the electric motor, hydraulic fluid is able to pass through the pump along the bypass flow path between the inlet and outlet. When viewed from yet another broader aspect, the present disclosure provides a method of controlling and damping a hydraulic actuator, comprising: powering an electric motor to drive a hydraulic pump to supply hydraulic fluid to the hydraulic actuator in an active mode of operation; and opening a bypass flow path through the hydraulic pump when the pump is not driven by the electric motor in a damping mode of operation. The bypass flow path may be arranged as described hereinabove. In particular, the bypass flow path may be blocked or unblocked, opened or closed, by movement of a moveable member arranged within the motor. Any of the features described in relation to the earlier aspects of this disclosure apply equally to these broader aspects.

BRIEF DESCRIPTION OF DRAWINGS

One or more non-limiting examples will now be described with reference to the accompanying drawings, in which.

DETAILED DESCRIPTION OF THE INVENTION

Figure 1:
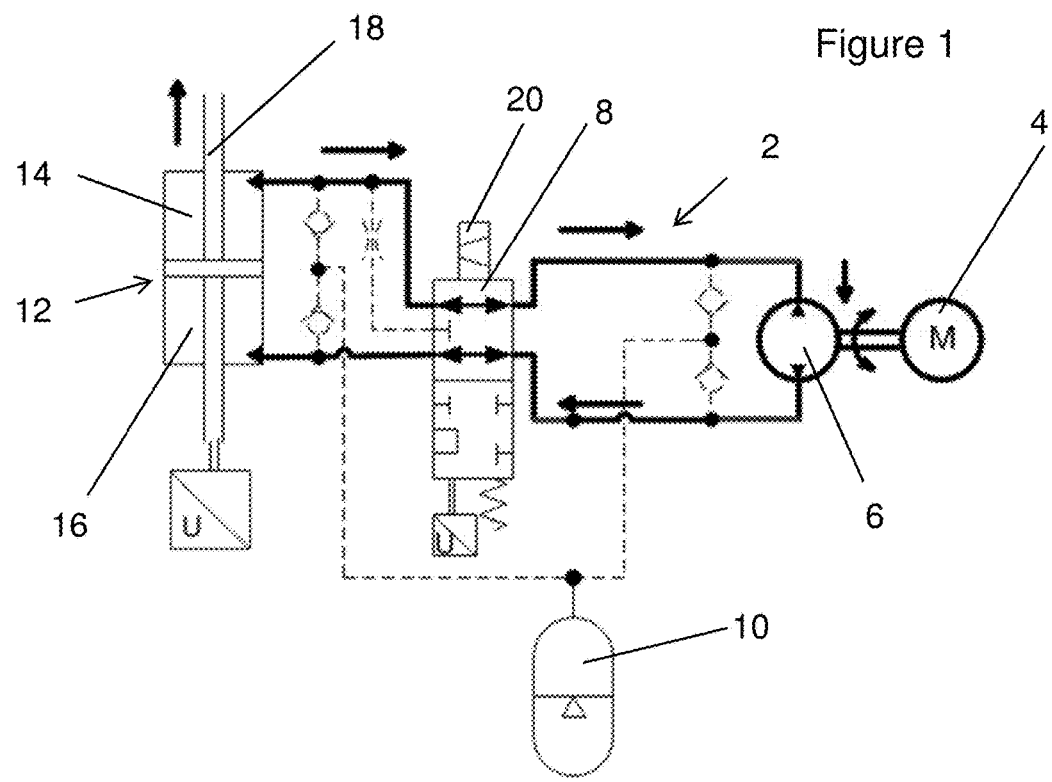
FIG. 1 shows a fluid flow diagram for an EHA in an active mode according to the prior art.
Figure 2:
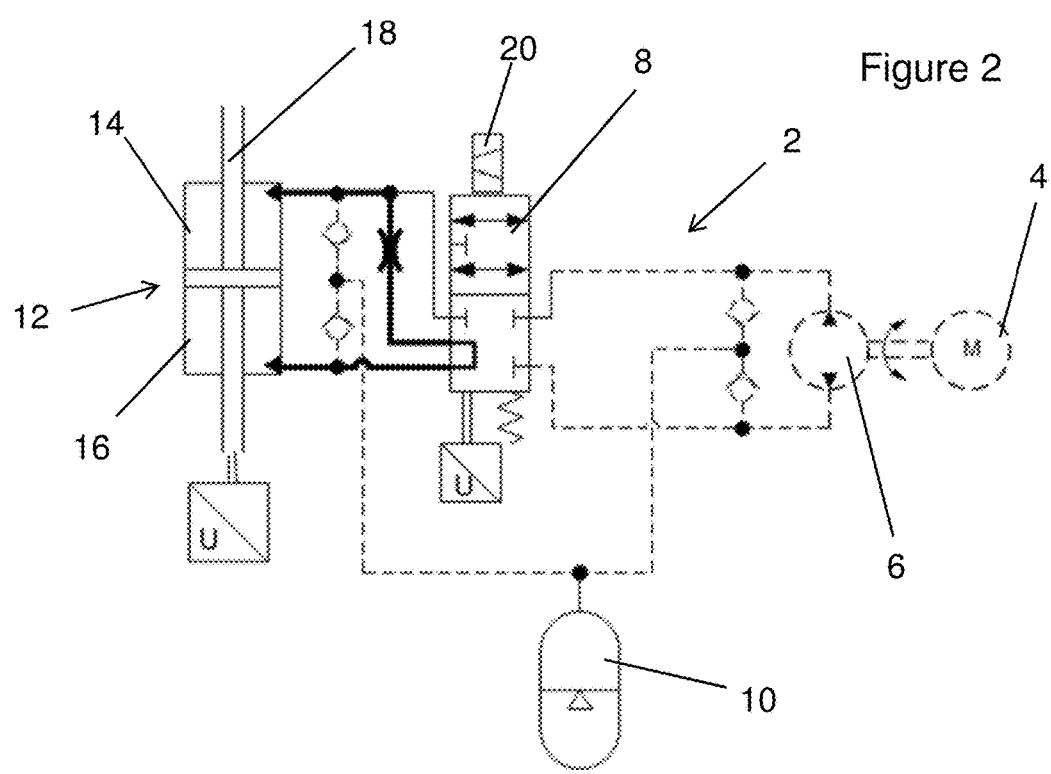
FIG. 2 shows a fluid flow diagram for an EHA in a damping mode according to the prior art.

FIGS. 1 and 2 show a fluid flow diagram for an electro hydrostatic actuator (EHA) 2 according to the prior art. FIG. 1 shows a reversible electric motor 4, a hydraulic pump 6, a mode valve 8, an accumulator 10 and a hydraulic actuator 12. The hydraulic actuator 12 shown in FIG. 1 consists of two separate chambers 14, 16 and an actuator ram 18. The mode valve 8 can be operated by a solenoid 20 and has two modes of operation which is typically on or off. The ram 18 is typically attached to a component on the aircraft such as an aerodynamic surface. The EHA typically has two modes of operation: an Electric Active Mode (EAM) and a damping mode. FIG. 1 shows the EHA in EAM. During EAM the motor 4 acts to drive the pump 6. This can be in either direction as the pump 6 is reversible. As the pump 6 is driven it causes hydraulic fluid to flow around a circuit as shown by the bold lines and the arrows in FIG. 1. This results in fluid being directed into one of the chambers 14, 16 of the hydraulic actuator 12. As fluid enters one of the chambers 14, 16 and leaves the other chamber 14, 16 this causes the ram 18 to move within the chambers 14, 16 which acts to move the aerodynamic surface it is attached to.

FIG. 2 shows a fluid flow diagram for the EHA 2 in damping mode. The damping mode can be initiated in circumstances where there is an electrical power generation failure or electronic control path failure. The solenoid 20 is capable of activating the mode valve 8 which alters the fluid flow within the system. The damping mode introduces a damping effect to the ram 18. This may be critical for certain applications of an EHA for example when in use on an aircraft. The damping mode is also the default mode when the ram 18 is not required to be engaged i.e. the pump 6 is not driven by the motor 4. The purpose of the damping mode is to provide a damping force to the ram 18 which may be connected to an aerodynamic surface, this prevents uncontrolled motion when external aerodynamic forces are applied to the surface. In the damping mode, fluid is free to flow between one chamber 14, 16 through the mode valve 8 and to the other chamber 14, 16 of the hydraulic actuator 12. The free flow of fluid between the two chambers 14, 16 acts to damp the motion of the ram 18. During the damping mode the fluid completely bypasses the pump 6 and only travels through the mode valve 8. The damping effect on the ram 18 is fixed by the mode valve 8.

Figure 3:
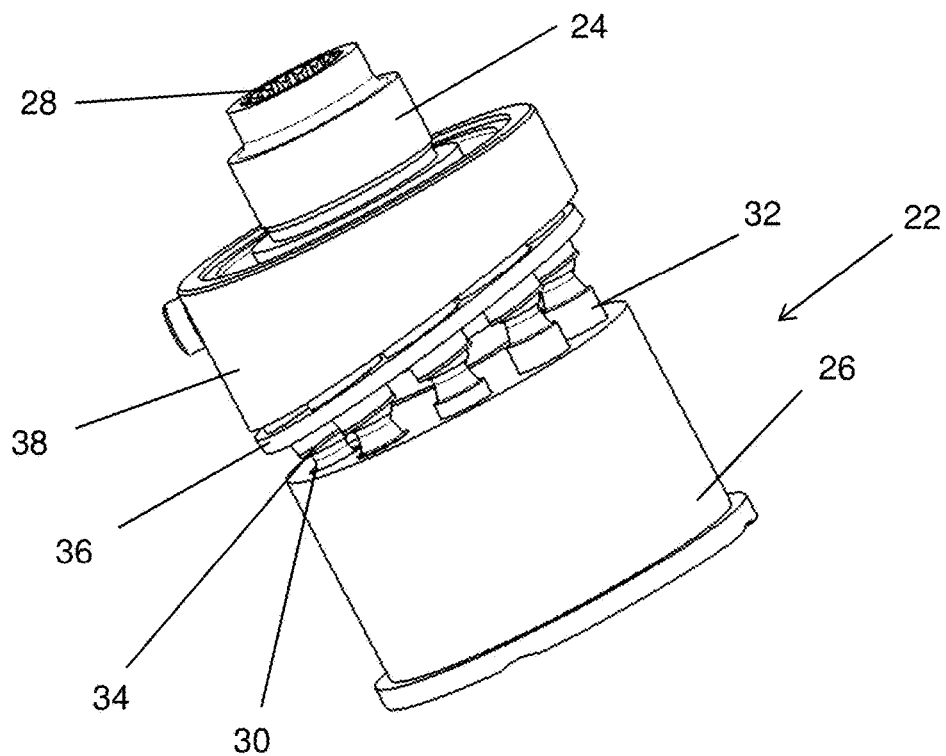
FIG. 3 shows a typical rotary piston pump.

FIG. 3 shows a typical rotary piston pump 22 operated by a motor shaft 24. The motor shaft 24 drives a pump barrel 26 by the connection of splines on the circumference of the motor shaft (not shown) and corresponding splines (not shown) on the internal surface of the pump barrel 26. The splines typically have a one to one correspondence and thus there is minimal relative rotation between the motor shaft 24 and the pump barrel 26. Internal splines 28 on the rear end of the motor shaft 24 provide for connection between the motor shaft 24 and the motor itself (not shown). The pump 22 is comprised of a pump barrel 26 with axial cylinders 30 extending therethrough. The spacing of the axial cylinders 30 is equiangular with respect to the centre of the pump barrel 26. Pistons 32 are present within the axial cylinders 30 and are free to reciprocate within the cylinders 30. The pistons 32 are linked by shoes 34 to a rotating plate 36 guided by a cam plate 38. The cam plate 38 is orientated at an angle such that, at any moment in time, at one side the pistons 32 are fully inserted in the cylinders 30 and at the other side they are drawn out of the cylinders 30.

During typical operation of the pump 22 the motor shaft 28, driven by a motor, drives the pump barrel 26 causing it to rotate. As the pump barrel 26 rotates the pistons 32 reciprocate within the axial cylinders 30 causing fluid to be drawn into the pump barrel 26 on one side and expelled on the opposite side of the barrel 26. Although the cam plate 38 is shown at a fixed angle, it may be adjustable to control the amount of fluid that is being displaced from the pump.

Figure 4:
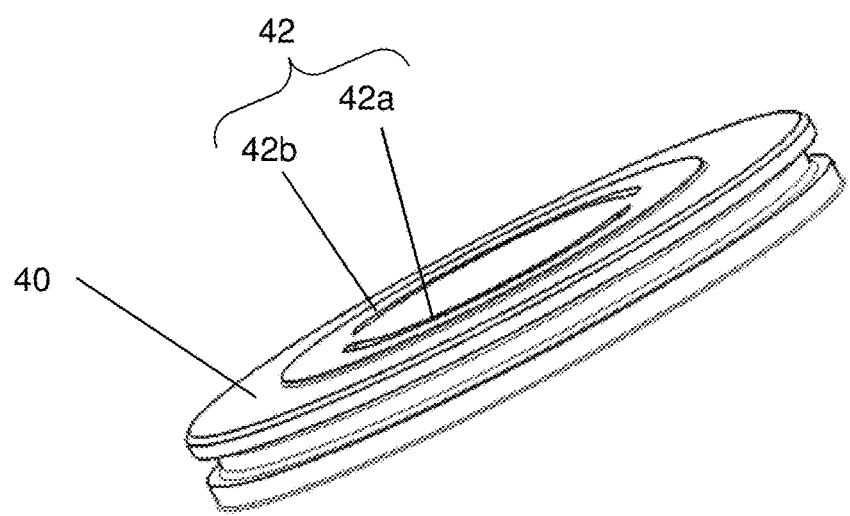
FIG. 4 shows the port plate of a typical rotary piston pump.

FIG. 4 shows a view of the underside of the pump 22 and shows in detail the port plate 40 which is attached to the base of the pump barrel 26. On the port plate 40 are two ports 42 which provide access to the cylinders 30 of the pump barrel 26. The ports 42 are semi-circular and follow the same arc as the circumferential positioning of the cylinders 30 in the pump barrel 26. The purpose of the provision of two ports 42 with a spacing between them is to prevent fluid being drawn in from the expulsion side of the pump. The gap between the ports 42 effectively corresponds to the points of change in gradient on the cam plate 38 from a positive to negative gradient or negative to positive gradient. One port 42*a* acts as an inlet to the pump 22 while the other port 42*b* acts as an outlet, or vice versa.

Figure 5:
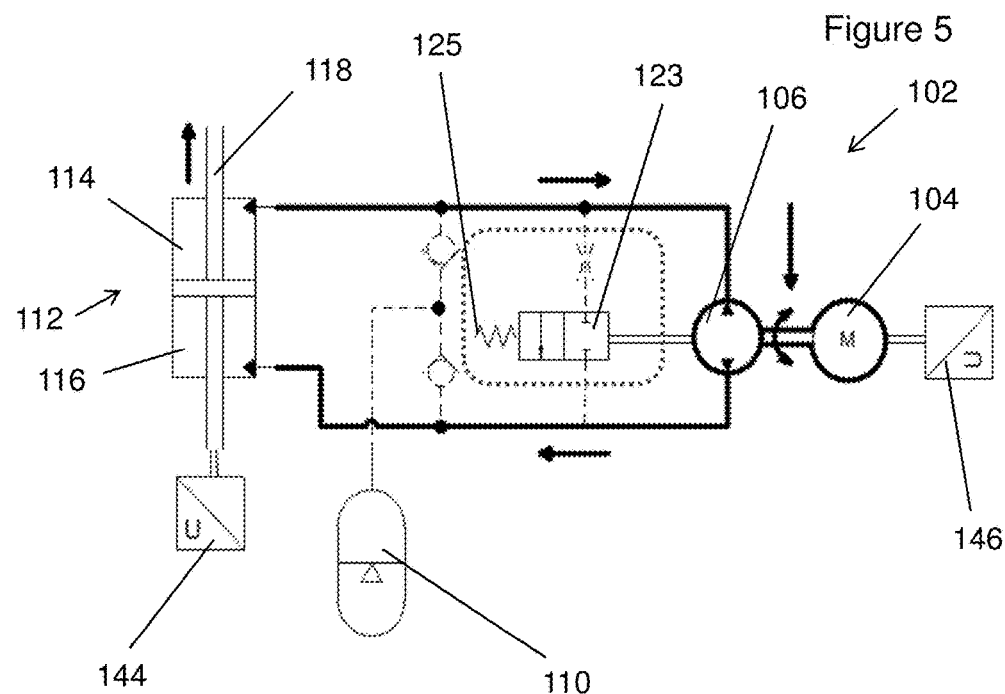
FIG. 5 shows a fluid flow diagram for an EHA in an active mode according to the present disclosure.
Figure 6:
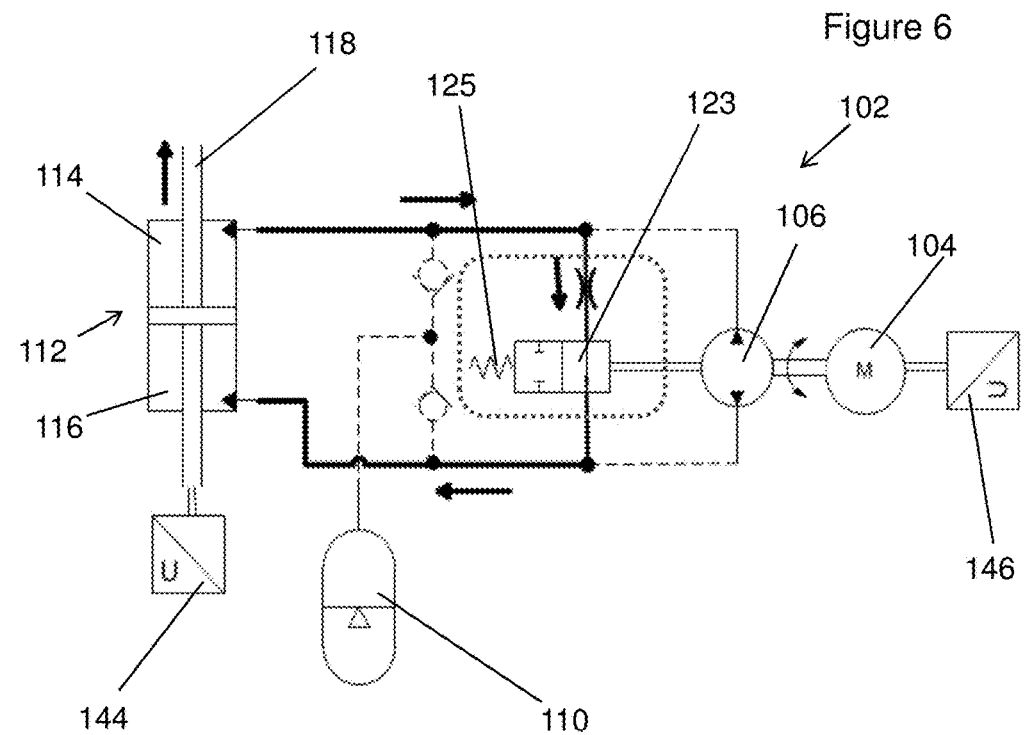
FIG. 6 shows a fluid flow diagram for an EHA in a damping mode according to the present disclosure.

FIGS. 5 and 6 show exemplary fluid flow diagrams according to the present disclosure. Instead of the damping mode being achieved by having a mode valve separate to the pump, it is now provided by a bypass flow path 123 incorporated internally within the pump 106. FIG. 5 shows a motor 104 which is operatively connected to a pump 106. Within the pump 106 there is an incorporated bypass flow path 123. A moveable member within the motor 104, for example an axially moveable member, acts to block the bypass fluid flow path 123. The moveable member will be described with reference to later Figures. The bypass flow path 123 is opened by a spring 125. FIG. 5 shows the pump during typical operation. During active mode the motor 104 rotates to operate the pump 106 which drives fluid around the circuit 102 through the pump 106. The motor 104 also acts to physically block the bypass fluid flow path 123. The fluid can be driven to/from the chambers 114, 116 of the hydraulic actuator 112 via the fluid path shown in bold and with corresponding arrows. Also shown is a linear transducer 144 connected to the ram 18 to signal when the ram 18 is in use. An additional linear transducer 146 is also connected to the motor 104 to signal when the component within the motor is blocking/unblocking the bypass fluid flow path 123.

FIG. 6 shows the pump 106 operating in damping mode. In damping mode the motor 104 is no longer energised and thus no longer drives the pump 106. In this damping mode the spring 125 acts to move the moveable member of the motor 104 which blocks the bypass fluid flow path such that it no longer acts to block the bypass fluid flow path 123. In this damping mode, fluid in each of the hydraulic actuator's chambers 114, 116 is free to flow along the bypass flow path 123, which is through the pump 106, to the other chamber 114, 116. This would not be possible in a typical piston pump as there is no means for the fluid to transfer from the cylinders on one side of the pump 106 to the other side. This is possible with the present disclosure and can be seen in the following Figures.

Figure 7:
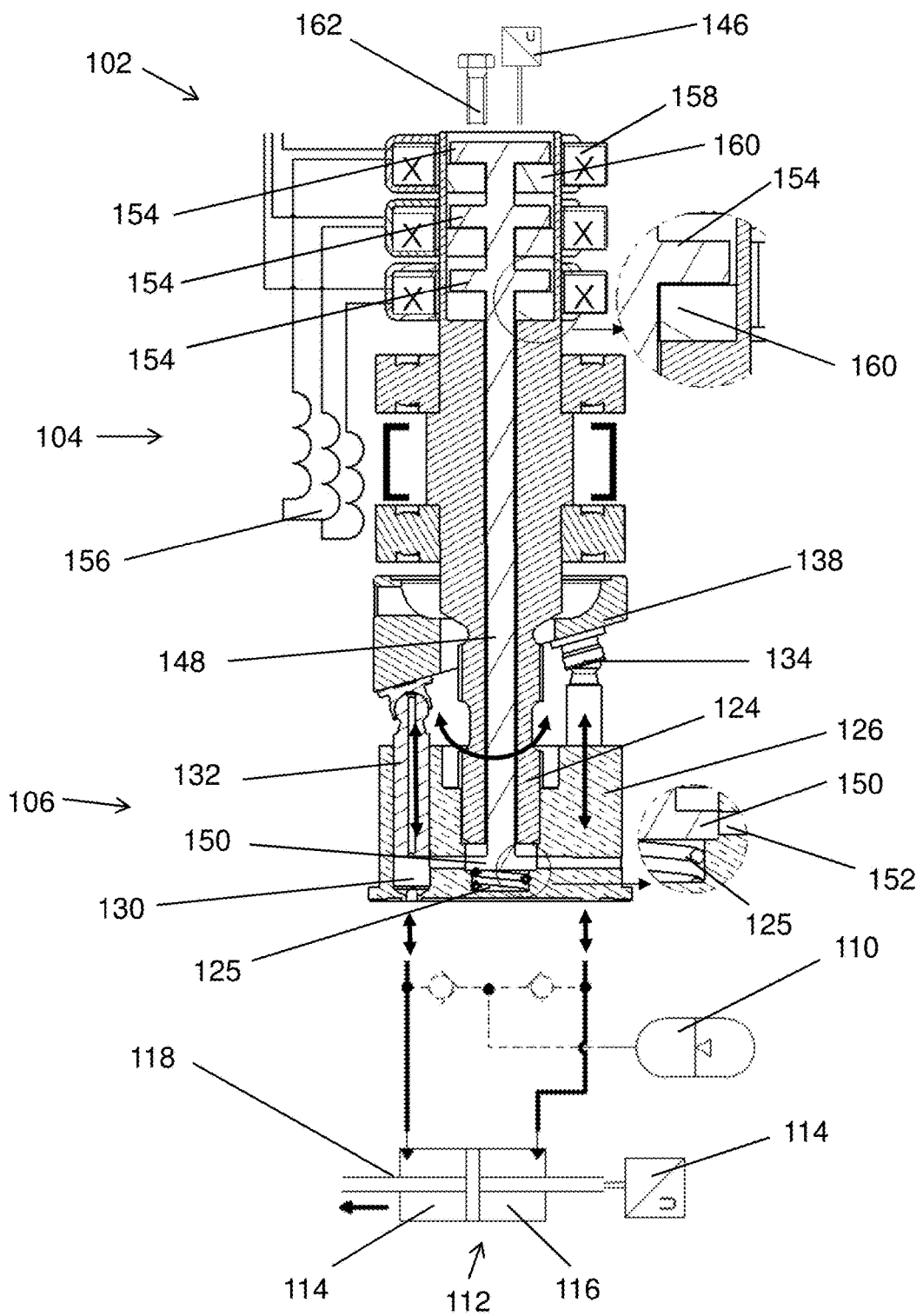
FIG. 7 shows an example of a pump where the bypass fluid flow path is blocked according to the present disclosure.
Figure 8:
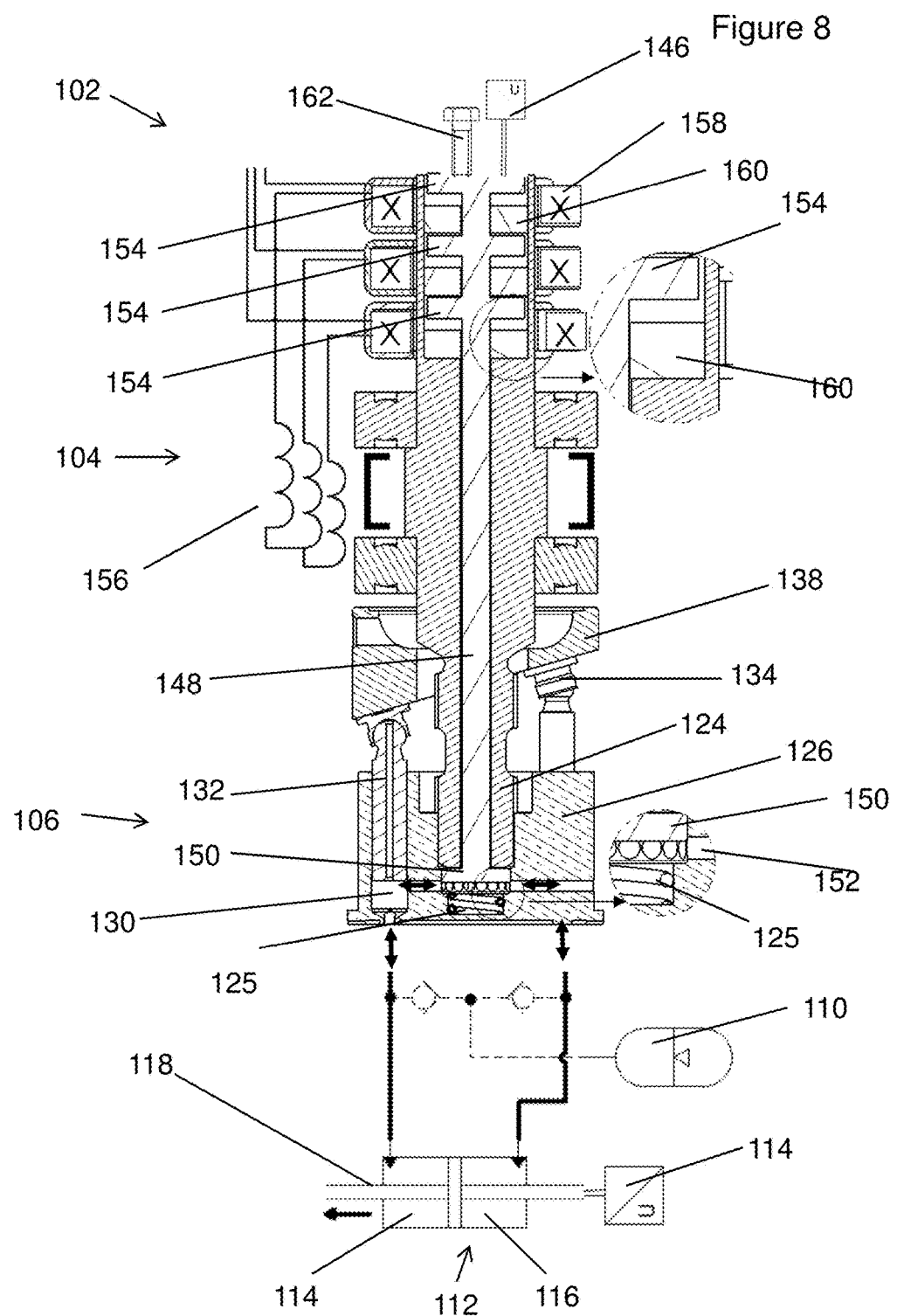
FIG. 8 shows the pump of FIG. 7 where the bypass fluid flow path is open.

FIGS. 7 and 8 show an EHA 102 comprising a motor 104, a pump 106 and a hydraulic actuator 112 in accordance with an example of the present disclosure. The EHA 102 comprises a pump 106 similar to the pump 22 shown in FIG. 3, however the EHA 102 utilises a one-part motor shaft 124 (i.e. no connecting splines 28). FIG. 7 shows the EHA 102 in an active mode. In the active mode the pump 106 is driven to rotate by the motor shaft 124. The motor shaft 124 passes from the motor 104, through the cam plate 138, to drive the pump barrel 126. The motor shaft 124 typically drives the pump barrel 126 by a series of splines 164 on the circumference of the motor shaft 124 (seen in FIGS. 9 and 10) and a series of corresponding splines on the internal region of the pump barrel 126. The motor shaft 124 has a hollow core through which passes an axial rod 148. The axial rod 148 has a lower disked shaped portion 150 at its lower end, proximal to the pump 106. The cylinders 130 in the pump barrel 126 have radial connecting ports 152 that lead towards a central internal cavity within the pump barrel 126. It is these connecting ports 152 that form the bypass flow path when they are open. The spring 125 is positioned in a recess in the core of the pump barrel 126. The disked shaped portion 150 is in contact with the spring 125 and acts to block central cavity and the connecting ports 152. The axial rod 148 effectively acts as a valve for the bypass flow path. This ensures that in the active mode fluid is only able to enter and leave the cylinders 130 by means of the inlet/outlet. In the active mode fluid is driven by the pump 106 into the respective chambers 114, 116 of the hydraulic actuator 112 which moves the ram 118.

FIG. 7 also illustrates the key components of the motor 104. The motor 104 operates similar to a typical motor and utilises three standard drive coils 156 and permanent magnets to drive the motor shaft 124. Typically the motor is a brushless A.C. motor that uses an angle sensor and control electronics to commute the current in the appropriate coils. In the active mode an electric current is passed through the coils 156, the presence of an electric current in the coils 156 in a magnetic field present due to the permanent magnets, causes the coil/permanent magnets to experience a force and thus rotate. This rotation drives the motor shaft 124 causing it to rotate. The axial rod 148 extends through the motor shaft 124 into the main housing of the motor 104. The axial rod 148 also has a three further ferromagnetic disk shaped portions 154 housed within the motor 104.

In series with the three drive coils 156 are three further 'valve' coils 158. The three valve coils 158 pass annularly around the motor 104 housing. The three valve coils 158 are separated and positioned on the motor 104 proximal to the disk shaped portions 154 of the axial rod 148. Within the shaft 124 are three ferromagnetic rings 160. These annular ferromagnetic rings 160 pass annularly around the axial rod 148 and are fixed in place, each ferromagnetic ring 160 is positioned proximal to a corresponding ferromagnetic disk 154 of the axial rod 148. When a current is passed through the valve coils 158 an electromagnet is produced causing the ferromagnetic disked shaped portions 154 of the axial rod 148 to form magnetic poles. Each of the three ferromagnetic disk shaped portions 154 is subsequently attracted to its corresponding ferromagnetic rings 160. This causes the rod 148 to be held in a position with the each ferromagnetic disk portion 154 held against the corresponding ferromagnetic rings 160. The ferromagnetic disks 154 being held against the ferromagnetic rings 160 can be seen in the enlarged view shown on FIG. 7. The valve coils 158 are wired in series with the motor coils 156 such that when the motor coils 156 are energised the valve coils 158 are energised. The axial rod 148 will be held in this fixed position when the motor 104 is energised i.e. the EHA is in an active mode.

When the axial rod 148 is held in position by the electromagnet established by the motor, this is the 'lower' position causing the lower disk shaped portion 150 to be forced into a position blocking the connecting ports 152. In this lower position the force provided by the electromagnets has to overcome the resilient force provided by the spring 125. The lower disk 150 blocking the connecting ports 152 can also be seen in the enlarged view of the disk portion 150. In the active mode the resiliency of the spring 125 attempts to push the axial rod 148 upwards. However, due to the strength of the electromagnets established in the motor holding the axial rod 148 in position, the axial rod 148 is not able to move axially. In the example EHA shown in FIG. 7, in the active mode, the axial rod 148 rotates with the motor shaft 124. However, it is appreciated that in some examples the axial rod 148 may not rotate with the shaft 124 and instead may remain rotationally fixed.

Also shown in FIG. 7 is the damping adjustment pin 162. This pin 162 can be used to control the amount of damping experienced by the hydraulic actuator 112. The pin 162 provides a limiting position preventing further movement of the axial rod 148 once it has moved into contact with the pin 162. This will be described in more detail with respect to FIG. 8.

FIG. 8 shows the EHA 102 in the damping mode, in this mode the motor shaft 124 is not driven by the motor 104, i.e. the motor 104 is not energised. In this case both the drive coils 156 and valve coils 158 are not energised, therefore the motor shaft 124 does not rotate and the ferromagnetic disked shaped portions 154 are not transformed into electromagnets. In this mode the bypass flow path within the pump 106 is opened so that fluid can freely flow through between the chambers 114, 116 of the hydraulic actuator 112. In this damping mode the spring 125 acts to push on the disk 150 causing the axial rod 148 to move upwards. This causes the ferromagnetic disk shaped portions 154 to move away from the ferromagnetic rings 160. This can be seen in the enlarged view also shown in this FIGURE. This upward movement of lower disk 150 and the axial rod 148 opens the bypass fluid flow path. Arrows on the FIGURE show the free flow of fluid between the cylinders 130 in the pump barrel 126. This allows fluid to flow between the chambers 114, 116. In the example shown the spring 125 will partially extend into the bypass flow path. It is appreciated that this may have an impact on the damping factor and therefore in alternative examples it may be possible to arrange the spring such that it does not impact the bypass flow path.

FIG. 8 also illustrates how the axial rod 148 moves to come into contact with the position limiting pin 162. The uppermost ferromagnetic disk portion 154 abuts against the position limiting pin 162 when the spring 125 acts to push the axial rod 148 upwards. The position limiting pin prevents the rod 148 from moving any further axially and thus impacts how far the lower disk 150 is able to move to open the bypass flow path. It is appreciated that the damping factor can be adjusted by causing more of the lower disk 150 to remain partially obstructing the bypass flow path, thus increasing the damping factor. In the example shown the position limiting pin 162 can be adjusted so as to adjust the damping factor. The pin 12 may be threaded or provided with any other suitable means to control its position. Using a position limiting pin 162 which is adjustable is particularly advantageous as the degree of damping can be adjusted after manufacture. This may be particularly useful if the EHA is used for different uses components which require different levels of damping.

Figure 9:
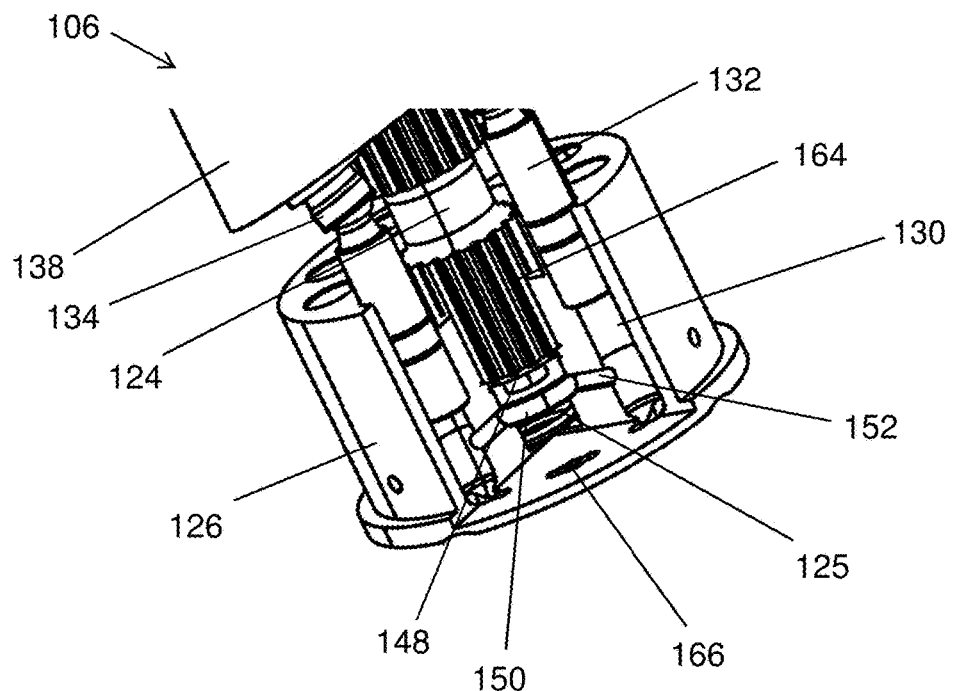
FIG. 9 shows a cut-away view of the pump in the active mode where the bypass fluid flow path is blocked according to the present disclosure.

FIG. 9 shows a cut-away view of the pump 106 according to the present disclosure. The motor shaft 124 comprises a plurality of spines 164 which act to drive the pump barrel 126. This FIGURE shows the pump 106 in the active mode. In this mode it can be seen that the lower disk portion 150 at the base of the rod 148 is positioned such that the connecting ports 152 are blocked. It can be seen that the spring 125 is positioned in the core of the pump barrel 126. In the active mode the spring 125 is compressed by the axial rod and therefore acts to bias the axial rod 148 upwards. In this active mode the motor shaft 124 drives the pump barrel 126 to rotate, this causes the pistons 132 to reciprocate in the cylinders 130, subsequently causing fluid to be drawn in and expelled from the inlets and outlets 166.

Figure 10:
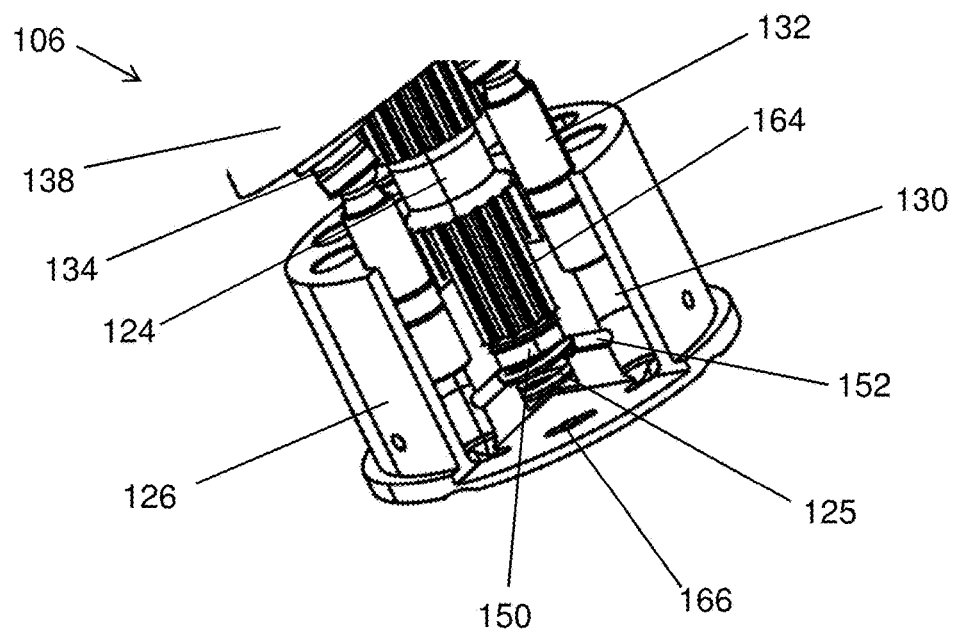
FIG. 10 shows a view of the pump of FIG. 9 in the damping mode.

FIG. 10 shows a cut-away view of the pump 106 according to the present disclosure in the damping mode. In this mode the motor 104 is no longer energised and allowing the axial rod 148 to move axially within the drive shaft 124 and motor 104. In the damping mode the spring 125 is able to push the lower disk 150 upwards thus opening the bypass fluid flow path. Once the lower disk 150 has moved to open the connecting ports 152 it is possible for fluid to pass into the pump 106, through an inlet into a cylinder 130, pass through the connecting ports 152 and out of the outlet of a different cylinder 130. This allows the pump 106 to act in a damping mode.

It is appreciated that in some examples, particularly those in which the axial rod 148 is able to rotate with the motor shaft 124, the clearance between the lower disk 150, the motor shaft 126 and connecting ports 152 must be designed to reduce the degree of leakage through the bypass fluid flow path in the active mode. Alternative there may be various additional features which could be incorporated to prevent leakage through the bypass flow path, for example, a rubber O-ring may be provided to seal the bypass fluid flow path.

In the examples shown, when in the damping mode, the axial rod 148 is forced to open the bypass fluid flow path by a spring 125 positioned in the pump barrel 126. Although a single spring 125 is shown it is appreciated that there could be a plurality of springs which would achieve the same result. It is also appreciated that the means for moving the axial rod 126 may not necessarily be positioned in the pump barrel 126. For instance, a spring could be positioned anywhere along the motor shaft 124 and act against lugs on the axial rod 125 to force it move upwards. Furthermore, although a spring 125 is shown to move the axial rod it is appreciated that any other suitable means could be used, for example a series of magnets or an alternative resilient material could be used.

In the examples shown three valve coils 158 are used to hold the axial rod 148 in a fixed position. It is appreciated that an alternative arrangement or a different number of coils could be used to achieve the same result. The positioning of the coils could be altered in order to hold the axial rod 148 at a different position. Furthermore in the example given the valve coils 158 are shown to be in series with the motor coils 156, it is appreciated that this may not be necessary and that the coils may be arranged, for example, in parallel. Additionally whilst in the example shown the valve coils are connected to the motor coils 156 it is appreciated that they may be part of a separate circuit with their own electronic control.

The examples disclosed above relate to a rotary piston pump, but it will be appreciated that other types of pump may be used instead. Furthermore, although in the examples shown the angle of the cam plate is fixed, it is appreciated that changing the angle of the cam plate alters the amount of fluid drawn in and expelled by the pump, therefore it may be adjustable in order for the flow rate of fluid to be modified e.g. depending on the application of the pump.

In the examples shown an axially moveable member 148 is provided in the motor shaft 126. However, it is appreciated that any other suitable member may be provided, for example, a member which is able to rotate in order to open the bypass flow path. For example, in one angular orientation the member might block the bypass flow path and in a second angular orientation it may open the bypass flow path.

The invention claimed is:

1. An electro hydrostatic actuator (EHA) comprising:
   electric motor; and
   a hydraulic pump driven by the electric motor, the hydraulic pump to supply hydraulic fluid to a hydraulic actuator, the hydraulic pump comprising:
      an inlet and an outlet for hydraulic fluid and an active fluid flow path arranged therebetween such that, in an active mode of operation when the pump is driven by the electric motor, hydraulic fluid is actively drawn in through the inlet and exhausted out through the outlet; and
      a bypass flow path arranged between the pump inlet and outlet, such that, in a damping mode of operation, hydraulic fluid is able to freely flow between the inlet and outlet in either direction;
   wherein the electric motor comprises:
      a moveable member arranged to move within the motor such that, when the motor is energised so as to drive the pump in the active mode of operation, the member has a blocking position that acts to block the bypass flow path, and when the motor is not energised the member moves within the motor to open the bypass flow path in the damping mode of operation.

2. An electro hydrostatic actuator according to claim 1, wherein the moveable member is arranged to move axially within the motor to open the bypass flow path.

3. An electro hydrostatic actuator according to claim 1, wherein the member is moved automatically, to open the bypass flow path, when the pump is not driven by the electric motor.

4. An electro hydrostatic actuator according to claim 3, wherein the pump comprises a resilient member arranged to move the member and thereby open the bypass flow path when the pump is not driven by the electric motor.

5. An electro hydrostatic actuator according to claim 1, wherein the electric motor comprises an electromagnetic arrangement that holds the moveable member in the blocking position.

6. An electro hydrostatic actuator according to claim 5, wherein the electromagnetic arrangement comprises one or more additional coils arranged to magnetise the moveable member.

7. An electro hydrostatic actuator according to claim 1, wherein the size of the bypass flow path is adjusted during use of the pump to provide a desired damping factor for the hydraulic actuator.

8. An electro hydrostatic actuator according to claim 7, wherein the motor comprises a pin arranged to limit the position of the member when it moves to open the bypass flow path.

9. An electro hydrostatic actuator according to claim 1, comprising a sensor arranged to detect movement of the member to determine whether the bypass flow path is open.

10. An electro hydrostatic actuator according to claim 1, wherein the hydraulic pump is a rotary piston pump comprising a pump barrel driven to rotate by a motor shaft and a plurality of axial cylinders in the pump barrel arranged to receive reciprocating pistons, wherein the inlet has a fluid connection with the axial cylinders in one half of the pump barrel and the outlet has a fluid connection with the axial cylinders in the other half of the pump barrel.

11. An electro hydrostatic actuator according to claim 10, wherein the bypass flow path comprises one or more connecting ports in the pump barrel that provide a direct fluid path, in the damping mode of operation, between the inlet connected to axial cylinders in one half of the pump barrel and the outlet connected to the axial cylinders in the other half of the pump barrel, wherein the member is arranged in the motor shaft to have a position that blocks the flow of fluid through the connecting ports in the active mode of operation.

12. A method of controlling and damping a hydraulic actuator, comprising:
   energising an electric motor to drive a hydraulic pump to supply hydraulic fluid to the hydraulic actuator in an active mode of operation; and
   controlling movement of a moveable member arranged within the motor to open a bypass flow path through the hydraulic pump when the pump is not driven by the electric motor in a damping mode of operation.

13. A method according to claim 12, wherein controlling movement of the moveable member comprises energising one or more additional coils arranged to magnetise the moveable member.

14. A method according to claim 12, comprising adjusting the size of the bypass flow path during use of the pump to provide a desired damping factor for the hydraulic actuator.

15. A method according to claim 14, wherein adjusting the size of the bypass flow path comprises adjusting a pin that is arranged to limit the position of the moveable member when it moves to open the bypass flow path.

* * * * *